Dec. 9, 1958 R. W. METZGER 2,863,513
HELICOPTER ROTOR BLADE
Filed Dec. 12, 1955 5 Sheets-Sheet 1
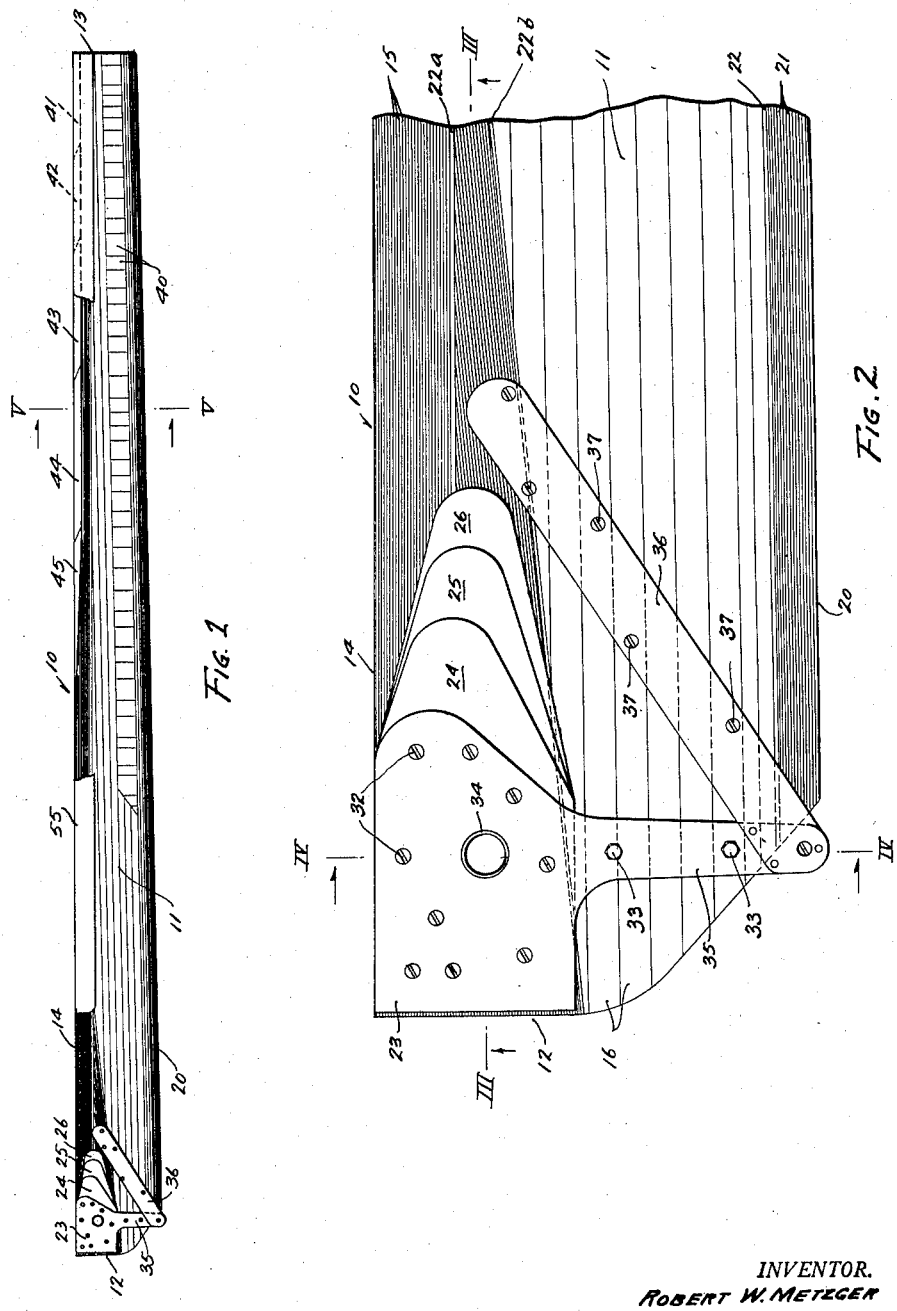
INVENTOR.
ROBERT W. METZGER
BY
Beau, Brooks, Buckley y Beau,
ATTORNEYS Dec. 9, 1958 R. W. METZGER 2,863,513
HELICOPTER ROTOR BLADE
Filed Dec. 12, 1955 5 Sheets-Sheet 2
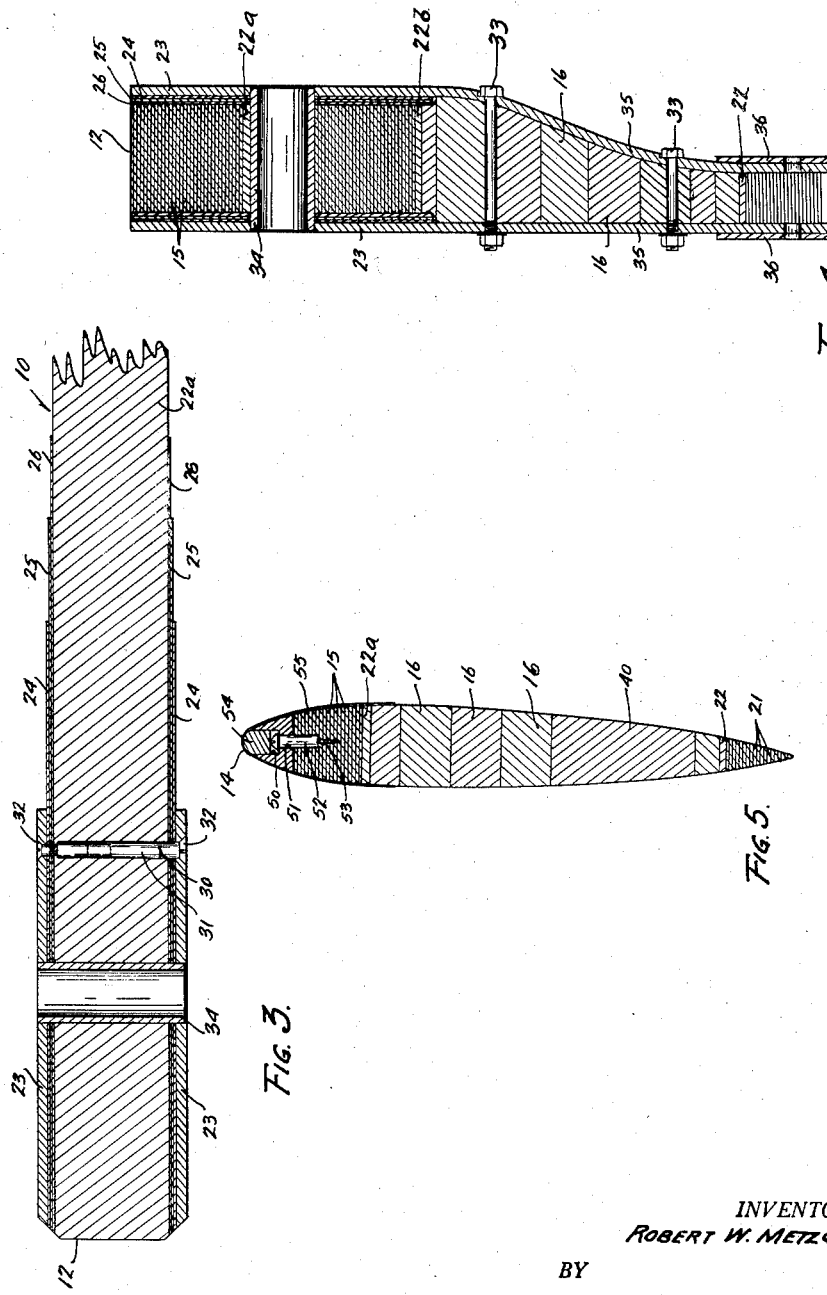
INVENTOR.
ROBERT W. METZGER
BY
Bean, Brooks, Buckley & Bean
ATTORNEYS Dec. 9, 1958  R. W. METZGER  2,863,513
HELICOPTER ROTOR BLADE
Filed Dec. 12, 1955  5 Sheets-Sheet 3
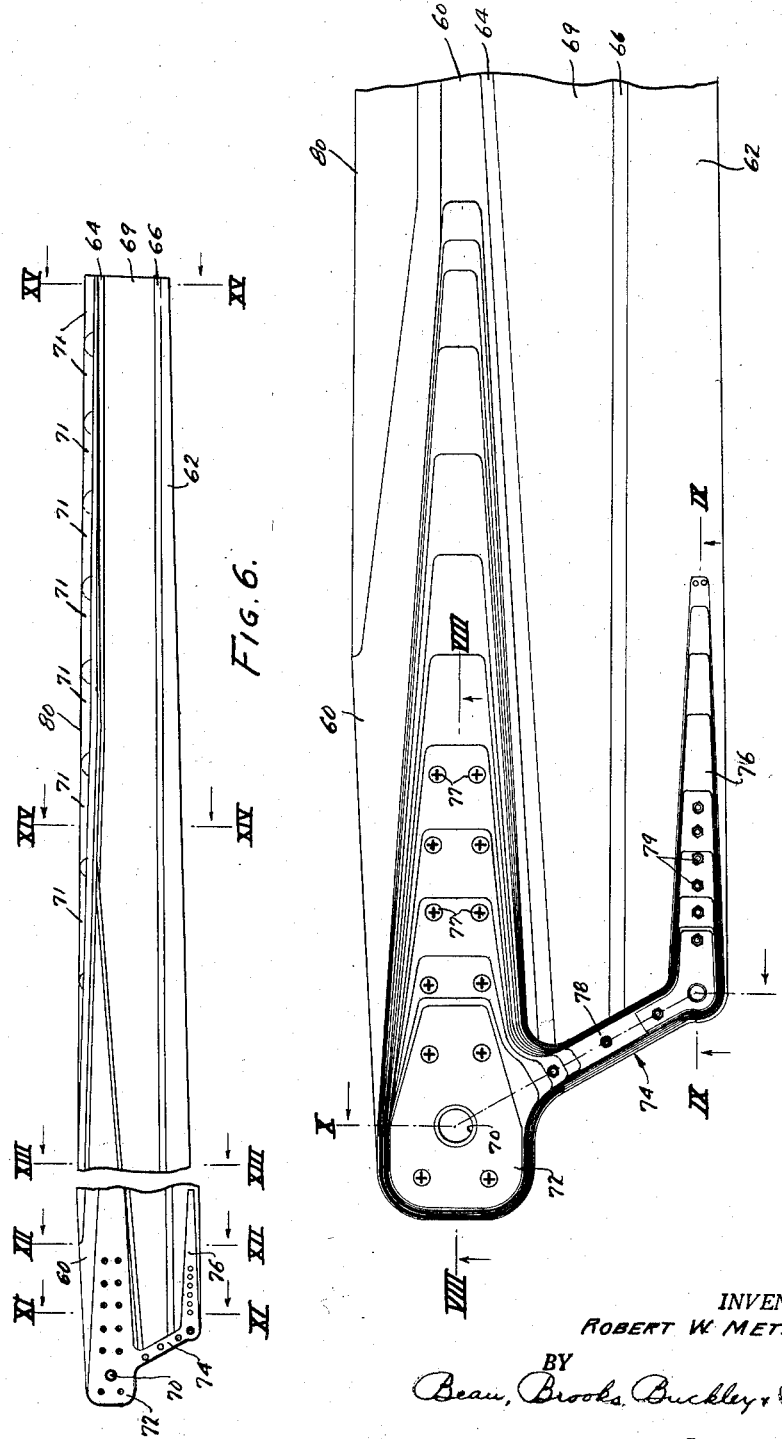
INVENTOR.
ROBERT W. METZGER
BY
Bean, Brooks, Buckley & Bean
ATTORNEYS Dec. 9, 1958 R. W. METZGER 2,863,513
HELICOPTER ROTOR BLADE
Filed Dec. 12, 1955 5 Sheets-Sheet 4
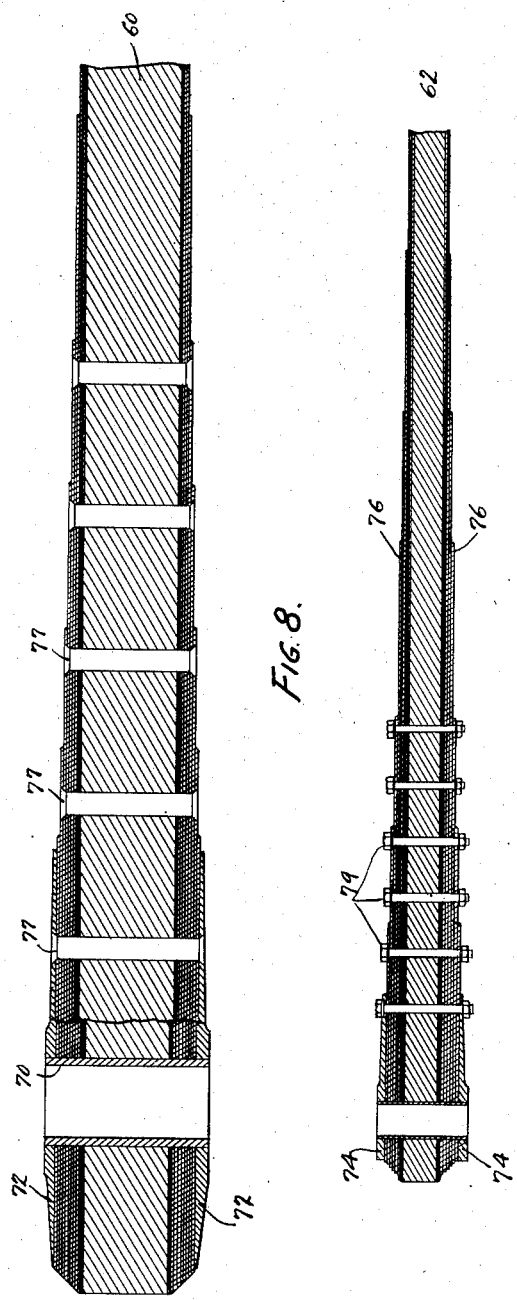
INVENTOR.
ROBERT W. METZGER
BY
Bean, Brooks, Buckley & Bean
ATTORNEYS

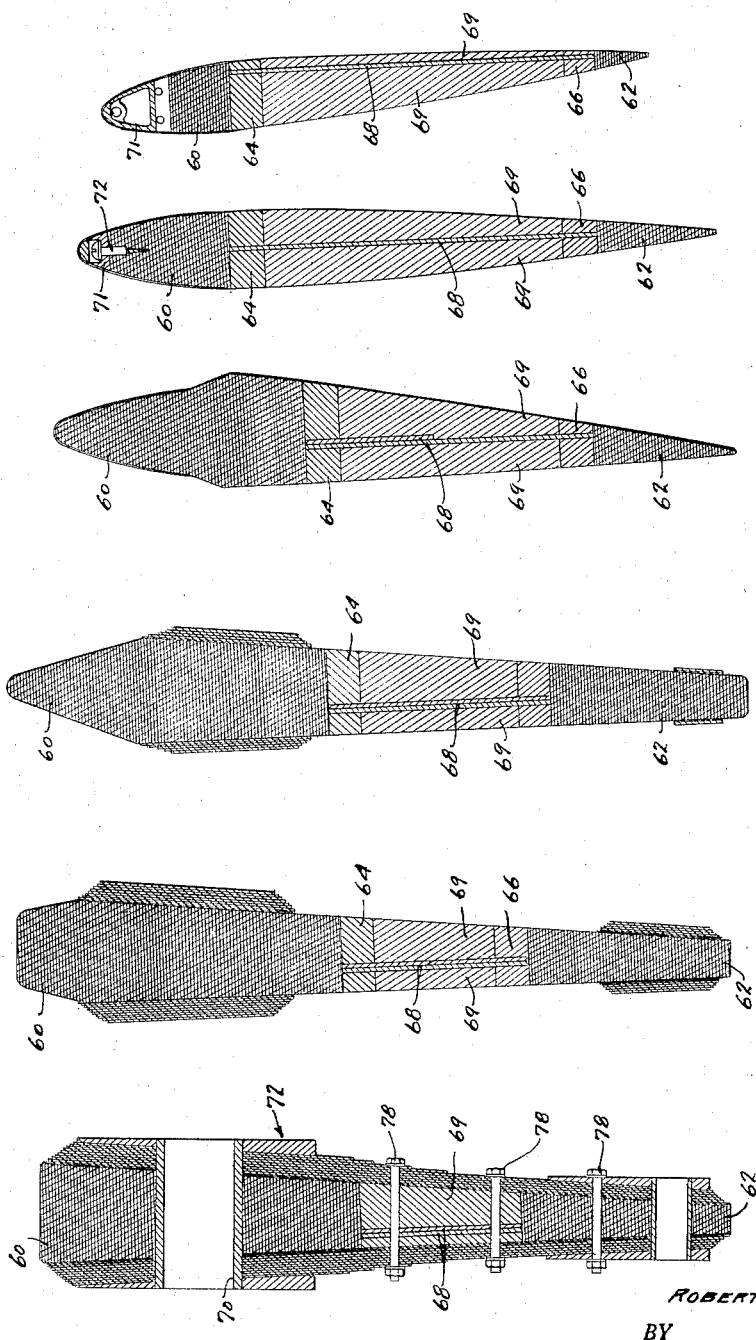

United States Patent Office 2,863,513
Patented Dec. 9, 1958

2,863,513

HELICOPTER ROTOR BLADE

Robert W. Metzger, Dallas, Tex., assignor to Bell Aircraft Corporation, Wheatfield, N. Y.

Application December 12, 1955, Serial No. 552,488

3 Claims. (Cl. 170—159)

My invention relates in general to rotary wing aircraft, and more particularly to blades for the rotors of helicopter aircraft of the type such as shown in U. S. patent issued to Arthur M. Young, No. 2,368,698 dated Feb. 6, 1945.

The invention has for a principal object the provision of a rotor blade with over mass balance in its outboard portion, thereby increasing the chordwise stiffness of the blade and at the same time reducing the weight thereof.

Another object is to provide an improved blade wherein the leading edge of the blade incorporates in improved manner metal weights covered by a metal leading edge member.

A further object is to provide a blade so designed that the centrifugal forces on the balance weights thereof will be carried by the wooden structure of the blade, thereby reducing the overall weight of the entire blade compared to prior blade designs.

Moreover, my blade is so designed that the over mass balance arrangement thereof results in moving the center of gravity of the complete blade forward, thereby allowing the use of additional wooden laminations in the trailing edge portion with consequent increase in the chordwise stiffness of the entire blade.

Furthermore, my invention simplifies and reduces the cost of manufacturing such rotor blades.

The above objects and advantages are embodied in the rotor blade constructions shown in the accompanying drawings, of which:

Fig. 1 is a plan view with cover portions broken away, of a rotor blade embodying the invention;

Fig. 2 is an enlarged fragmentary plan view of the root end of the blade of Fig. 1;

Fig. 3 is a fragmentary longitudinal sectional view, on an enlarged scale, of the root end of the blade of Fig. 2 as taken on line III—III of Fig. 2;

Fig. 4 is a transverse sectional view on an enlarged scale taken on line IV—IV of Fig. 2;

Fig. 5 is an enlarged transverse sectional view taken on line V—V of Fig. 1;

Fig. 6 is a fragmentary plan view of a modified form of construction of the blade of the invention;

Fig. 7 is a fragmentary plan view, on an enlarged scale, of the root end portion of Fig. 6;

Figs. 8, 9, 10 are fragmentary sectional views, on an enlarged scale, taken along lines VIII—VIII; IX—IX; and X—X, respectively, of Fig. 7; and Figs. 11, 12, 13, 14, 15 are sections, on an enlarged scale, taken along lines XI, XII, XIII, XIV, XV, respectively, of Fig. 6.

The invention contemplates a novel rotor blade comprised generally of a novelly laminated wooden structure having only a sheet steel leading edge cover plate, and provided with metal ballasts in the outboard end portion of the blade. This arrangement obviates the need for the usual metal tension bar or spar leading from the blade retention pin, and permits the use of an over mass balance arrangement which places the center of gravity of the outboard portion of the blade more forword on the blade than in prior designs. The chordwise stiffness of the blade is also increased because of the laminated wood arrangement. Furthermore, tendency to coning of the blade is decreased; and manufacture of the blade is greatly simplified because no steel spar or the like is needed.

In the embodiment shown in Figs. 1–5 of the accompanying drawings, the blade of the invention as indicated at 10 is illustrated as having a main body portion 11; a root end portion 12, and a tip end portion 13. The leading edge structure 14 of the blade is made preferably of birch laminations 15 which extend generally from the root portion to the tip portion of the blade. Also extending spanwise of the blade are a number of horizontally disposed wooden rails 16 which extend from the birch laminations 15 to a point near the trailing edge 20 of the blade. The trailing edge structure of the blade comprises a series of birch laminations 21 terminating in a spruce strip 22; while similar spruce strips 22a, 22b, are provided in conjunction with the laminations 15.

The top and bottom faces of the root portion of the blade are embraced between main grip plates 23—23, under each of which is a series of relatively thin shingle plates 24, 25 and 26. The shingle plates 24, 25 and 26 are of increasing lengths so as to yieldingly embrace the root of the blade structure. The plates are of suitable metal adhesively bonded together and secured to the root end of the blade by means of adhesive bonding, and a series of secondary fasteners in the nature of bolts passing from the outer surface of one of the main grip plates to the outer surface of the opposite grip plate may also be used. Telescopic screws 31 having cone-shaped slotted heads 32 countersunk into the faces of the grip plates may be used as shown in the drawing.

A bearing sleeve 34 is provided for the retention pin (not shown) of the rotor hub, the sleeve 34 being dimensioned to pass through the root portion of the blade with its ends substantially flush with the outer surfaces of the grip plates. The main grip plates 23 are provided with integral arms 35 extending chordwise of the blade and secured thereto by bolts such as those shown at 33 in Fig. 2. A brace plate 36 may also be provided in conjunction with the grip plate arms 35—35 at their outer ends and are bolted to the blade structure as indicated at 37 (Fig. 2). As shown in Fig. 4 the grip plate arms 35 are shaped to conform to the contour of the blade at the root end thereof.

As shown in Fig. 1, the outboard end portion of the blade comprises at its mid-section a number of transversely aligned filler blocks 40 which are formed of lightweight filler material such as balsa wood or the like. A series of ballast weights as indicated at 41, 42, 43, 44 and 45 are inlaid in the leading edge structure of the blade at the outboard end portion thereof. These ballast pieces are secured to the birch laminations by any suitable means but preferably by adhesive bonding supplemented by shear pins in the form of fastening means as shown in Fig. 5. Thus, as here shown (Fig. 5) each of the ballasts is provided with a counterbore 50 and an aperture 51 through which a bushing 52 is passed. The bushing extends into the laminations 15 and is formed with a central opening for the passage of a wood screw 53 which is screwed into the laminations 15. Thus, the screw head resides in the counterbore 50, and a plug 54 is press fitted or threaded into the counterbore 50; having its outer end shaped to conform to the leading edge contour of the blade. The leading edge cover or sheath 55 encloses the ballasts and functions also as an abrasion sheet. This sheath extends across the top and bottom surfaces of the blade for distances sufficient to cover the birch laminations and one or more of the rails 16. This sheath extends from the tip portion of the blade to a point near the root portion thereof, and it is secured in place by adhesive or any other suitable means. As shown in Fig. 1, the points between the ballasts are in overlapping relation and the inboard ballast 45 is wedge-shaped so as to terminate in a smooth continuous surface where it joints the outer birch lamination.

Figs. 6–15 illustrate another form of rotor blade of the invention which is generally similar to the construction shown in Figs. 1–5 inasmuch as the blade thereof also includes, as its basic structure, a pair of spaced wooden spar components. Thus, in Figs. 6–15 the blade comprises a laminated birchwood spar component 60 at the leading edge of the blade and a laminated birchwood spar component 62 at the trailing edge of the blade. A spruce wood spar piece 64 is adhesively bonded to the rear edge of the front plywood spar component 60, and a similar spruce wood spar member 66 is adhesively bonded to the front edge of the trailing edge plywood component 62. The members 64—66 are recessed to receive opposite edges of plywood web member 68 which is arranged to provide in conjunction with the spar pieces 64—66 an I-beam type wood component for the rotor blade structure. The spar or flange pieces 64—66 provide suitable degree of rigidity against vertical bending, while the web member 68 provides resistance to lag bending of the blade; while the unitary I-beam construction as a whole provides resistance against torsional rotation or twisting of the blade sections from root to tip end of the blade.

Filler blocks as indicated at 69 of balsa wood or other suitable light-weight material are filled into the spaces between the spar members 64—66 to complete the desired aerodynamic sectional profile for the blade; the leading and trailing edge laminated components 60—62 being also shaped so as to conform to the desired aerodynamic sectional profile at the corresponding stations on the blade; as shown for example in detail in Figs. 10–15.

To provide means for mounting the blade upon the rotor hub mechanism (not shown), a retention pin receiving sleeve is provided as indicated at 70; the sleeve 70 being formed integrally with a grip plate structure indicated generally at 72. The grip plate structure is preferably formed in a shingle-like configuration comprising a series of somewhat resilient metal plates arranged in stepped relation, so as to provide a somewhat springy grip means embracing the root end portion of the blade, such as explained hereinabove in connection with the blade construction of Figs. 1 to 5.

The blade grip structure of Figs. 6–15 may also preferably include an integral brace arm arrangement as indicated at 74—76; so as to brace the mounting connections between the root end of the blade and the metal plate gripping structure which engages with the rotor hub referred to hereinabove. The grip plate members 72—74—76 may of course be connected to the wooden blade structure in any suitable manner, such as by means of bolts as indicated at 77—78—79 (Figs. 7, 8, 9, 10); it being understood that any other suitable form of hub mounting plate arrangement may be employed in conjunction with the wooden blade construction of the present invention in lieu of the arrangement illustrated and described hereinabove. A leading edge cover or sheath as indicated at 80 (Figs. 6, 7) is also preferably applied, as in the case of the member 55 (Fig. 1).

As in the case of the blade construction illustrated in Figs. 1–5, in accord with the present invention all of the wooden and metal parts of the blade construction are adhesively bonded together to form a resilient yet integral blade construction having superior weight distribution and improved bending and torsional resistances. The type of adhesives employed will of course depend upon considerations such as strength requirements; cost of materials; nature of the adjacent materials to be bonded together, and so on; but it is to be understood that the present invention contemplates that any suitable wood-to-wood and wood-to-metal adhesive substances will be employed, as may be preferred.

As explained hereinabove in connection with the blade construction of Figs. 1–5, ballast devices may also be inlaid into the leading edge structure of the blade of the form illustrated in Figs. 6–15. Thus, for example as shown in Figs. 6, 14, 15, metal ballast pieces as indicated at 71 may be nested into the leading edge portion of the outboard end of the blade, and fastened thereto by adhesive bonding as well as by supplemental screw devices as indicated at 72 (Fig. 14).

In any case, it is a feature of the present invention that the provision of generally parallel but spaced span-wise extending laminated birchwood spar components adjacent the leading and trailing edge portions of the blade, interconnected by means of web components, and supplemented by relatively light-weight filler components carrying out the preferred aerodynamic sectional profile for the blade, all cooperate to provide a novel and improved blade construction. The I-beam effect obtained by the construction of the invention provides the necessary lag-wise stiffness for the blade, as well as the necessary anti-coning stiffness and anti-twisting stiffness for the blade; and yet it will be appreciated that the blade of the invention may be readily manufactured by relatively simple shop processes.

It is a particular feature of the construction of the present invention that the addition of ballast members in the leading edge of the outboard end portion of the blade permits the use of substantial quantities of relatively strong wood pieces in the trailing edge I-beam flange component of the construction; thereby improving the truss effect of the over-all construction against chord-wise deflections. Furthermore, by concentrating the ballast devices adjacent the tip end of the blade and ahead of the center pressure of the blade, the centrifugal loads thereon are readily carried to the rotor hub construction through means of the leading edge laminated birchwood component of the blade construction, without requiring the use of metal spar devices or the like such as would unduly complicate the blade construction and render the over-all blade relatively expensive to fabricate.

Whereas only a few forms of the blade of the invention have been illustrated and described in detail herein it will be understood that various changes may be made therein without departing from the spirit of the invention and the scope of the appended claims.

What is claimed is:

1. A rotor blade comprising leading and trailing edge spar components formed of laminated relatively strong wood interconnected by a web component resistant to blade stresses in the plane thereof, filler wood pieces supplementing said web component to complete the desired sectional profile, a plurality of metal ballasts inlaid in the leading edge portion of the blade in the outboard end portion only thereof and adhesively bonded to the leading edge spar component, a metal sheath covering the leading edge of the blade and enclosing said ballasts and a portion of the wooden structure therebehind, and rotor hub grip means arranged on each side of the blade at the root portion thereof and fixed to the root end of said leading edge spar component, said spar components and web component and filler wood pieces and metal ballasts and said metal sheath all being adhesively bonded together.

2. A composite wood rotor blade comprising leading and trailing edge spar components formed of laminated stress resistant wood pieces interconnected by a stress resistant wooden web component, light weight filler material supplementing said web and spar components to complete the desired blade sectional profile, metal ballast means inlaid in the leading edge portion of the blade in the outboard end portion thereof and adhesively bonded to said leading edge spar component whereby centrifugal loads on said ballast means are carried to said root portion of said blade by said leading edge spar component, a metal sheath covering the leading edge of the blade and enclosing said ballast means, and rotor hub grip means resilient in bending arranged on each side of the blade at the root portion thereof.

3. A rotor blade comprising relatively spaced leading and trailing edge spar components formed of laminated stress resistant wood pieces, light weight filler wood pieces supplementing said spar components to complete the desired blade sectional profile, metal ballast means inlaid in the leading edge portion of the blade in the outboard end portion thereof in spaced relation to the root portion thereof and adhesively bonded to said leading edge spar component, whereby centrifugal loads on said ballast means are transmitted to said root portion by said leading edge spar component, a sheet metal sheath covering the leading edge of the blade and enclosing said ballast means and a portion of the wooden structure therebehind, and rotor hub grip means of metal plate form arranged on each side of the blade at the root portion thereof, all of said wood and metal parts being adhesive-bonded together to provide an integral blade structure.

References Cited in the file of this patent

UNITED STATES PATENTS

| | | |
|---|---|---|
| 1,969,781 | La Cierva | Aug. 14, 1934 |
| 2,470,056 | Seible | May 10, 1949 |
| 2,580,363 | Schnitt | Dec. 25, 1951 |
| 2,648,390 | Lagabbe | Aug. 11, 1953 |
| 2,694,458 | Stevens | Nov. 16, 1954 |